United States Patent [19]

Fukuta

[11] Patent Number: 4,579,244

[45] Date of Patent: Apr. 1, 1986

[54] FUEL TANK CAP

[75] Inventor: Masakazu Fukuta, Aichi, Japan

[73] Assignee: Kabushiki Kaisha Tokai Rika Denki Seisakusho, Aichi, Japan

[21] Appl. No.: 622,974

[22] Filed: Jun. 21, 1984

[30] Foreign Application Priority Data

Jun. 22, 1983 [JP] Japan .............................. 58-96488[U]

[51] Int. Cl.[4] ............................................. B65D 51/16
[52] U.S. Cl. ...................................... 220/210; 220/203; 220/206; 220/DIG. 33
[58] Field of Search ............... 220/210, 206, 367, 373, 220/374, DIG. 27, DIG. 33, 203

[56] References Cited

U.S. PATENT DOCUMENTS

| | | | |
|---|---|---|---|
| 3,186,580 | 6/1965 | Previte | 220/206 |
| 3,938,692 | 2/1976 | Crute | 220/203 |
| 3,945,454 | 3/1976 | Kinoshita et al. | 220/210 X |
| 4,245,751 | 1/1981 | Neiman | 220/210 X |

Primary Examiner—Steven M. Pollard
Attorney, Agent, or Firm—Finnegan, Henderson, Farabow, Garrett & Dunner

[57] ABSTRACT

A fuel tank cap is provided having airtight engagement with the oiling port of a fuel tank. The cap is locked to the oiling port by a key cylinder. Removal of the cap from the oiling port is accomplished by initial rotation of the key cylinder to enable communication between the interior of the fuel tank and the ambient atmosphere through a passage which is adjacent to and substantially parallel with the key cylinder and further rotation of the key cylinder to disengage the cap from the oiling port.

3 Claims, 4 Drawing Figures

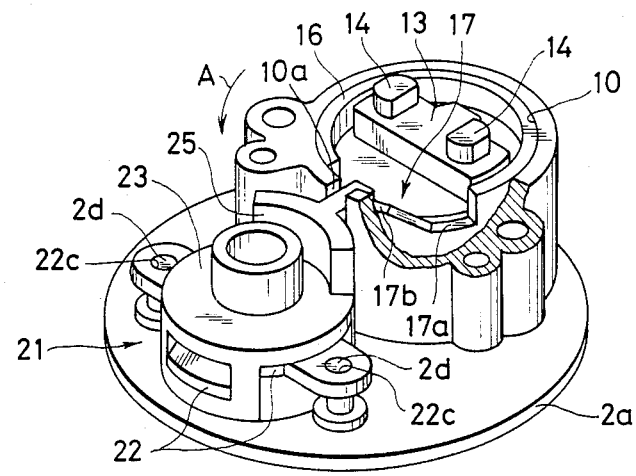
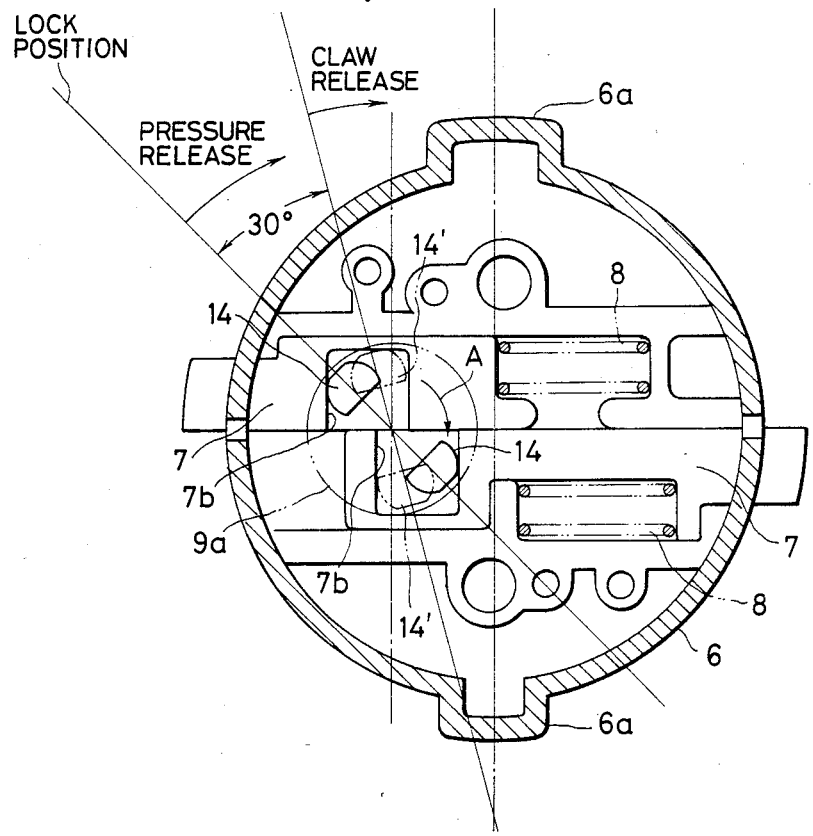

ns and advantages of the invention as well as the invention itself, will become more apparent to those skilled in the art when considered in the light of the accompayning drawings, wherein:

FUEL TANK CAP

FIELD OF THE INVENTION

This invention relates to a cap for a fuel tank and particularly to a cap which facilitates pressure equalization between the interior and the exterior of the cap.

BACKGROUND OF THE INVENTION

With the advent of more stringent environmental pollution laws, attention has been given to emissions and fuel spillage from the fuel tank. During operation of a vehicle, consumption of the fuel within the tank creates a vacuum therein which degrades operation of the engine and is suddenly released when the cap on the fuel tank is removed. On the other hand, if a motor vehicle sits in the sun or is in an extremely warm environment, the pressure within the fuel tank soon exceeds atmospheric pressure. When the cap is removed, pressure equalization can result in fuel being expelled from the tank.

Japanese Utility Model Application No. 15228/83, laid open on Nov. 13, 1978, describes a fuel tank cap wherein a cam surface is integrally formed on a lock piece. When a key cylinder is rotated after insertion of a key, the lock piece is moved so that engagement between latch 6 and the spring edge of a tank is released. At the same time, the cam surface allows a cooperating arm to be lowered to release pressure within the tank. In order to remove the cap, however, further rotation of the cap is required.

U.S. Pat. No. 3,938,692 issued to Billy G. Crute on Feb. 17, 1976, shows a pressure-vacuum relief fuel tank cap with a roll-over safety valve. This cap also achieves pressure equalization between the inside and outside of the tank.

A problem with the fuel tank caps of the prior art including the two caps specifically referred to above is that the mechanism for pressure relief is located in line with a lock mechanism, the caps are thick and bulky. Also, removed of the caps first requires rotation of the key to unlock the cap and then rotation of the cap. This is an inconvenient set of movements particularly since a filling station attendant is often working onehanded as his other hand is holding the pump nozzle.

OBJECTS AND SUMMARY OF THE INVENTION

An object of the present invention is a fuel tank cap which is convenient to use.

Another object of the present invention is a fuel tank cap which enables the equalization of the pressure between the inside and outside of a fuel tank to avoid fuel spillage.

Still another object of the present invention is a fuel tank cap which is relatively thin.

A further object of the present invention is a fuel tank cap which is convenient to attach to and remove from a fuel tank.

These and other objects are obtained by a cap for a fuel tank comprising a fuel tank cap for airtight engagement with the oiling port of a fuel tank comprising a cap body including an engaging mechanism for engaging the cap body to the oiling port, a passage through the cap body for enabling communication between the fuel tank and the ambient atmosphere; a valve seat in the passage, a valve biased against the valve seat to block communication through the passage when the engaging means engages the cap body to the oiling port, a rotatable key cylinder adjacent to and substantially parallel with the passage, and a cam body mounted on the key cylinder and in contact with the valve case such that initial rotation of the key cylinder causes the cam body to bias the valve case away from the valve seat to unblock the passage between the fuel tank and the ambient atmosphere and subsequent rotation of the key cylinder disengages the engaging mechanism from the oiling port so that the fuel tank cap may be removed therefrom.

BRIEF DESCRIPTION OF THE DRAWINGS

These and other objects, features and advantages of the invention as well as the invention itself, will become more apparent to those skilled in the art when considered in the light of the accompayning drawings, wherein:

FIG. 2 is a perspective view of the major components of the present invention with the cap cover remained;

FIG. 3 is a cross-sectional view of the fuel tank cap of FIG. 1 taken along the lines III—III.

DETAILED DESCRIPTION OF THE PREFERRED EMBODIMENT

Figure 1:
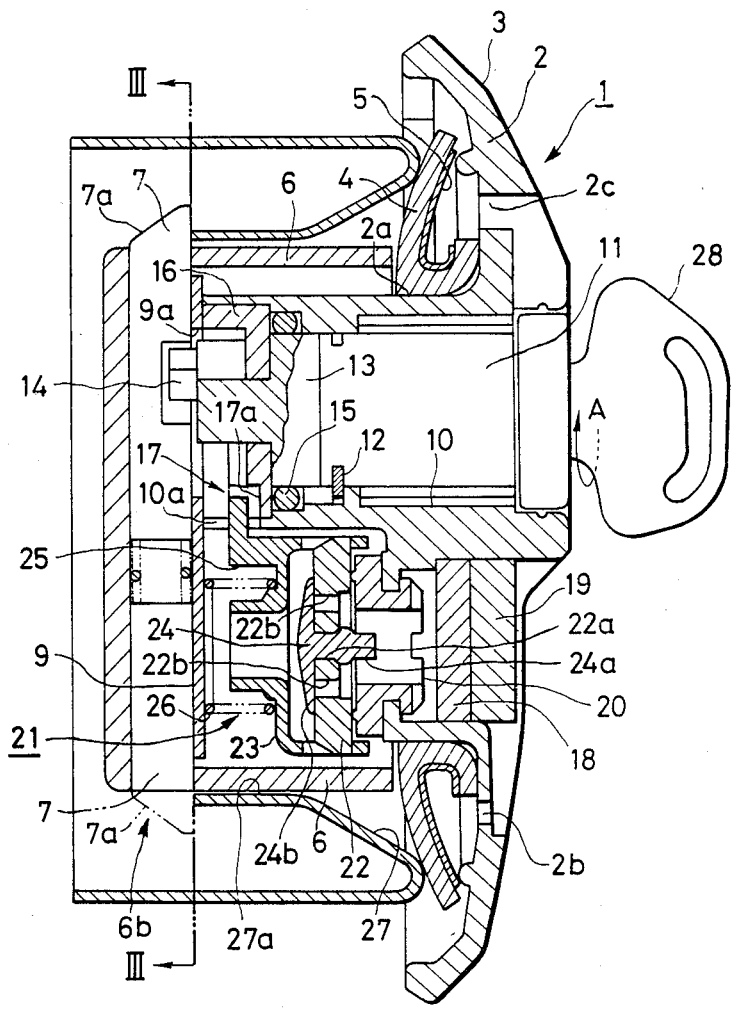
FIG. 1 is a longitudinal cross section of the fuel tank cap of the present invention.

A cap 1 includes a body 2 casted of zinc, and a cover 3 of steel plate rigidly mounted on the body 2 by press-fitting to cover the exterior of the body 2 entirely. A seal 4 which for instance is made of oilproof rubber, fits in the outer periphery of a neck portion or a fitting portion 2a interiorly of the body 2. A leaf spring 5 is disposed against the seal 4.

A substantially cylindrical case 6 is provided with guide projections 6a on the outer periphery thereof. A pair of engageable claws 7 are reciprocally movable in the inner base of the case 6 and are adapted to allow the respective ends to pass through openings 6b in the case 6. The claws 7 project from the openings 6b and include, at the forward ends thereof, inclined guides 7a. Springs 8 are provided for urging the engageable claws 7 outwardly of the case 6. A keeper plate 9 holds the engageable claws 7 and springs 8 in the base of the case 6 and is secured to the case 6 by screws.

A through hole 10 passes through the body 2 and receives a key cylinder 11 which is prevented from slipping out of the through hole 10 by a stop 12. A rotary member 13 is rotatably mounted on the key cylinder 11. The rotary member 13 is formed at its forward end with projections 14 engageable with slots 7b in the engageable claws 7 through a hole 9a in the keeper plate 9. An O-ring 15 is interposed between the rotary member 13 on the outer periphery thereof and the through hole 10. A cam member 16, for example made of plastic, is mounted peripherally of the rotary member 13 and is rotatable thereof. The outer periphery of the cam member 16 is provided with a cam surface 17 composed of a first stepped portion 17a and a second stepped portion 17b.

A stepped vent 18 passes through the body 2 in parallel with the through hole 10. Filter members 19 are received in an enlarged diameter portion of the vent 18 whereas an annular valve seat 20 of, for example rubber, with a vent in the center thereof is mounted in a reduced diameter portion of the vent 18. The vent 18 communicates with the outside atmosphere by vents 2b, 2c formed by a clearance between the body 2 and the cover 3.

A valve case 21 is provided, and for example comprises a elastic sheet member 22 and a cover 23 integrally and elastically engaged with the sheet member 22. The sheet member 22 includes a central setting hole 22a and four vents 22b (only two are shown) disposed around the setting hole 22a. The sheet member 22 includes at its opposite end openings 22c adapted to receive projections 2d from the body 2 to hold the valve seat 20 and position the valve case 21 with respect to the body.

A bell-shaped relief valve 24, which may be made of pliable rubber material, includes a stem 24a forcibly inserted in the setting hole 22a. The relief valve 24 is provided with a thin pliable, collar 24b in close contact with the sheet member 22 so as to cover the vents 22b.

A substantially L-shaped arm 25 is integral with the cover 23 and projects therefrom with the forward end of the arm 25 being positioned through a notch 10a formed peripherally of the through hole 10 to face the cam surface 17 of the cam body 16. A compression spring 26 is disposed between the cover 23 and the keeper plate 9. An oiling port 27 is formed in a fuel tank (not shown) and includes an annular bend 27a. A key 28 can be inserted in the key cylinder 11 for rotatably operating the rotary member 13.

When it is desired to mount the cap 1 on the oiling port 27 of a fuel tank, the projections 6a of the case 6 are inserted into a recesses (not shown) formed in the bend 27a. This properly aligns the guides 7a with the inner periphery of the bend 27a so that the engageable claws 7 are inwardly displaced against the springs 8. When the guide projections 6d are fully inserted into the recess, the engageable claws 7 engage with the forward end of the bend 27a to bring the seal 4 into close contact with the oiling port 27.

In this manner, when the oiling port 27 in the tank is closed by the cap 1, the key 28 may be removed from the key cylinder 11 and the cam surface 17 of the cam member 16 aligns the first stepped portion 17a with the notch 10a. The arm 25 is thus positioned to face the first stepped portion 17a to provide a predetermined clearance therebetween, and the sheet member 22 is urged by the bias of the compression spring 26 into close contact with the valve seat 20.

When fuel in the fuel tank is consumed a vacuum is created in the tank. As a result of the higher external air pressure, ambient air enters the vent 18 through the vents 2b, 2c and the filter members 19. The collar 24b of the relief valve 24 is deformed inwardly to open the vent 22b in the sheet member 22 so that the ambient air may be supplied to the interior of the fuel tank to reduce the negative pressure to a predetermined level.

On the other hand, if a vehicle equipped with the cap of the present invention is parked in the hot sun, evaporation of fuel occurs in the fuel tank so that the pressure within the fuel tank becomes greater than atmospheric pressure. Evaporated fuel is condensed in a carburettor to prevent the pressure level within the fuel tank from being above a predetermined positive pressure level.

When the key 28 is inserted into the key cylinder 11 and is rotated in the direction of the arrow A the rotary member 13 and the cam member 16 are rotated in the same direction. After the key 28 has been rotated through an angle of about 30°, the projections 14 are moved into engagement with the sides of the slots 7b (as shown by two dot and chain line of FIG. 3).

Figure 4:
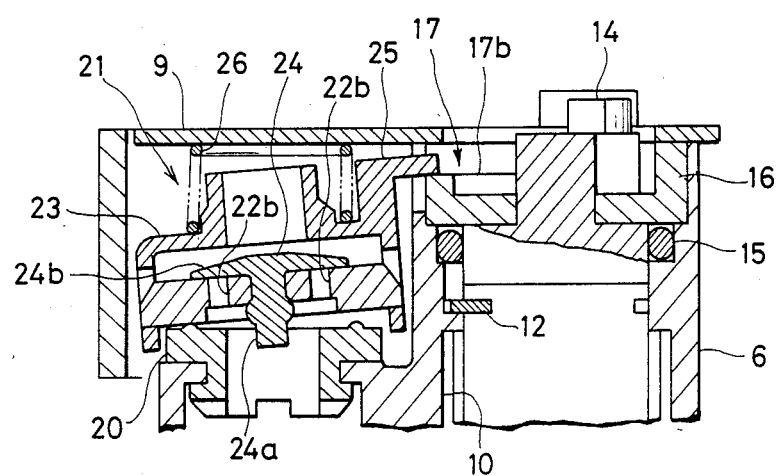
FIG. 4 is a second longitudinal cross section of the fuel tank cap of the present invention.

At the same time, the cam member 16 is rotated through an angle of about 30° in the direction of the arrow A to cause the second stepped portion 17b of the cam surface 17 to face the notch 10a. Accordingly, the arm 25 is positioned on the second stepped portion 17b (FIG. 2) to tilt the whole valve case 21 against the bias of the compression spring 26 to move the sheet member 22 away from the valve seat 20 (FIG. 4).

As a result the fuel tank communicates with the ambient atmosphere to render pressure in the fuel tank equal to the outside. When the key 28 is further rotated through an additional angle of about 60°, the projections 14 of the rotary member 13 inwardly displace the engageable claws 7 against the springs 8 to disengage the forward ends of the engageable claws 7 from the forward end of the bend 27a so that the cap 1 may be removed from the oiling port 27. Because the pressure in the fuel tank has already been equalized to atmospheric pressure when the cap 1 becomes removable, difficulty in removal of the cap body from the fuel tank due to negative pressure within the tank, or leakage of fuel derived from ejection of fuel therefrom by positive pressure in the tank are eliminated.

According to the invention, the cam body 16 is mounted on the key cylinder 11 in such a manner that the valve case 21 which carries the relief valve 24 is in close contact with the valve seat 20 adjacent the key cylinder 11 and is forcibly kept away from the valve seat 20 before the cap body 1 is removed when the key 28 is rotated. This simple arrangement enables the cap body to hermetically seal the tank and to prevent fuel gas from evaporating and escaping from the fuel tank. A further advantage is thus obtained in that no adverse effect is derived from pressure in the fuel tank when the cap 1 is removed.

As is apparent from the foregoing description, the present invention permits provision of a cap for a fuel tank, which is capable of eliminating differences in pressure between the interior and the exterior of the fuel tank by a simple structure and as a consequence of rotation of a key during removing of the cap from the fuel tank. While the salient features of the invention have been described with reference to the drawings, it should be understood that the described embodiment is susceptible of modification without departing from the spirit and scope of the following claims.

What is claimed is:

1. A fuel tank cap for sealing the opening in a fuel filler pipe, said cap comprising:

a cap body having engaging means for securing said cap body within said opening and including conduit means through said cap body for communication with the atmosphere;

valve means within said cap body for controlling air flow between the exterior and interior of said tank, said valve means including a valve member, a valve casing, a valve seat and a valve chamber, said valve member being formed of a pliable material and mounted within said valve casing, said valve casing being biased against said valve seat, said valve seat being adjacent said valve chamber;

said valve means further including relief means for admitting air within said tank when pressure within said tank is below atmospheric pressure a predetermined amount by lifting said valve member from said valve casing to admit air passed to said valve chamber from said conduit means; and said valve means further including key actuated vent means for venting excess pressure within said tank to said valve chamber and through said conduit means to the atmosphere, said vent means comprising a rotatable key cylinder having cam means engaging said valve casing, said cam means having at least two stepped surfaces and said valve casing having projection means for engaging said stepped surfaces, wherein initial rotation of said key cylinder from a closed locked position slidably engages said stepped surfaces with said projection means to lift said projection means and to force said valve casing away from said valve seat thereby venting said tank to the atmosphere through said valve chamber and said conduit means while said cap is engaged in said opening, continued rotation of said cylinder disengaging said cap engaging means from said opening.

2. The fuel cap as defined in claim 1 wherein said engaging means comprise a filler pipe engaging claw connected to said key cylinder; and spring means for biasing said claw into locking engagement with said filler pipe, said claw being retracted by continued rotation of said cylinder.

3. A fuel tank cap as defined in claim 2 wherein said initial rotation of said key cylinder traverses approximately 30° and said continued rotation of said key cylinder traverses approximately an additional 60°.

* * * * *